(No Model.)

A. E. TAVERNIER.
PRESSURE GAGE.

No. 420,287.  Patented Jan. 28, 1890.

Witnesses
Will Norton
A Lockhard

Inventor
Alphonse E. Tavernier
by his Attorneys
John J. Halsted Jr.

UNITED STATES PATENT OFFICE.

ALPHONSE EDOUARD TAVERNIER, OF LONDON, ENGLAND, ASSIGNOR OF TWO-THIRDS TO GEORGE COLEMAN FRASER AND EDWARD CASPER, BOTH OF SAME PLACE.

PRESSURE-GAGE.

SPECIFICATION forming part of Letters Patent No. 420,287, dated January 28, 1890.

Application filed August 7, 1889. Serial No. 320,035. (No model.)

*To all whom it may concern:*

Be it known that I, ALPHONSE EDOUARD TAVERNIER, a citizen of the Republic of France, residing at London, England, have invented a new and useful Improved Pressure-Gage, of which the following is a specification.

My invention relates to a pressure-gage in which the pressure is counterbalanced by a spring and indicated on a dial or its equivalent, means being provided for testing and adjusting the power of the spring.

Figure 1:
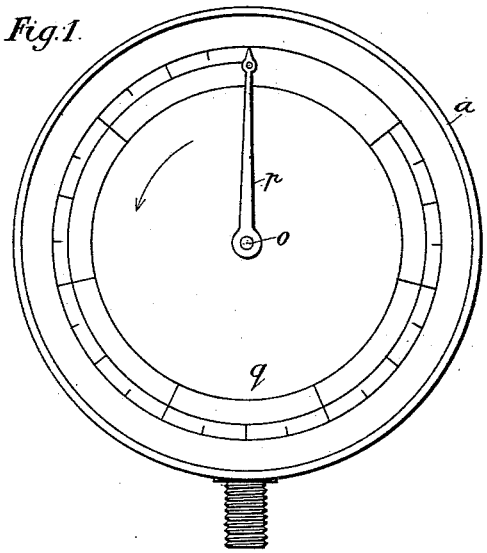
Figure 2:
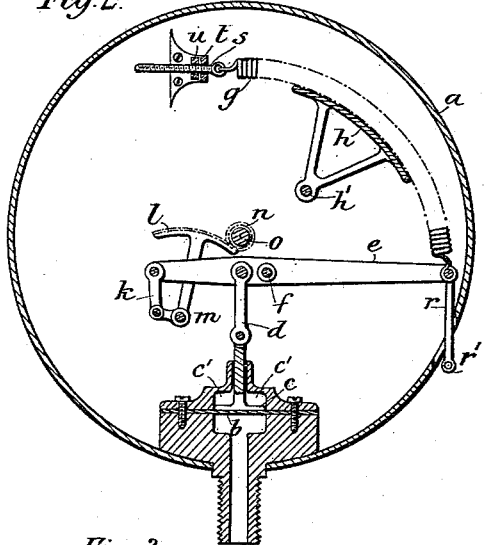
Figure 3:
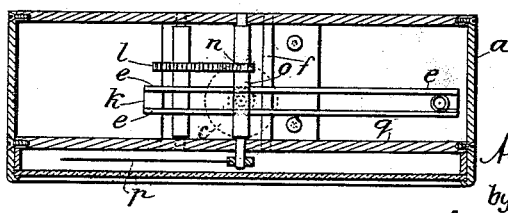

In the accompanying drawings, Figure 1 is a front elevation of a pressure-gage constructed according to my invention. Fig. 2 is a vertical section, and Fig. 3 is a horizontal section.

$a$ is a case, in which is a flexible diaphragm $b$, intended to receive the pressure of the steam or other fluid. Upon this diaphragm rests a piston $c$, working in a cylinder $c'$ and connected by a link $d$ with an arm $e$, pivoted at $f$, the free end of which arm is attached to one end of a spring $g$ in such a manner that the pressure upon the diaphragm is communicated to and counterbalanced by the said spring. The spring itself is carried upon a guide $h$, pivoted at $h'$ to the case of the apparatus, the said guide being bent to the form of an arc of a circle of which the pivot $h'$ is the center. The pivoted arm $e$ is connected by a link $k$ to a toothed sector $l$, pivoted at $m$ and engaging with a pinion $n$ on the arbor $o$ of an index-finger $p$, moving over a dial $q$, whereby the compression of the spring, and consequently the pressure, is indicated.

The arched form of the guide $h$ permits a longer, and consequently a more sensitive, spring to be employed within a limited space, and also allows the two ends of such spring to have their connections, as shown, at about right angles to each other, and the pivoting of this guide facilitates the distention or contraction of the spring by permitting the guide to move on its center whenever the spring is adjusted or moved.

$r$ is a rod connected to the free end of the arm $e$ and extending outside the case, the said rod at its free end $r'$ being adapted to receive a weight or weights, whereby the accuracy of the spring in relation to the indicating mechanism can be tested.

To enable the pressure of the spring $g$ to be regulated, the end of the same most remote from the arm $e$ is attached to a screw $s$, which is adjustable in a guide $t$ by means of a nut $u$.

Having now particularly described and ascertained the nature of my said invention and in what manner the same is to be performed, I declare that what I claim is—

1. In a pressure-gage having a piston operated by the pressure on an elastic diaphragm, a lever pivoted within the case of the gage and connected to the piston, a pivoted arched guide, and a counterbalancing-spring supported in the form of an arc on such guide and connecting such lever, substantially as described.

2. In a pressure-gage, the combination of a piston upon or against which the pressure acts through the agency of an elastic diaphragm, a lever pivoted within the case of the gage and connected directly to said piston, a pivoted arched guide $h$, a spiral spring supported on said guide in the form of an arc and arranged to act on said lever to counterbalance the pressure exerted through the piston, and means, substantially as described, for indicating on a dial the movement of the lever.

3. In combination, the elastic diaphragm, the piston $c$, pivoted arm $e$, link $d$, connecting the piston with such arm near its fulcrum, an adjustable spring attached to one end of said arm, and a link connecting its other to a sector and indicator, and a rod for a testing-weight connected to one end of the arm and extending outside the case, all substantially as set forth.

ALPHONSE EDOUARD TAVERNIER.

Witnesses:
   JOHN E. BOUSFIELD,
*Of the firm of G. F. Redfern & Co., 4 South Street, Finsbury, London, Patent Agents.*
   A. S. ALBUTT.